(12) United States Patent
Yoshida (10) Patent No.: US 8,459,946 B2
(45) Date of Patent: Jun. 11, 2013

(54) HORIZONTAL AXIS WIND TURBINE

(75) Inventor: Shigeo Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 12/785,078

(22) Filed: May 21, 2010

(65) Prior Publication Data

US 2010/0296932 A1    Nov. 25, 2010

(30) Foreign Application Priority Data

May 22, 2009    (JP) ................................. 2009-124132

(51) Int. Cl.
*F03D 9/00*    (2006.01)

(52) U.S. Cl.
USPC .............. 416/17; 416/153; 416/155; 416/162

(58) Field of Classification Search
USPC ....................... 416/10, 17, 153, 155, 159, 162
See application file for complete search history.

(56) References Cited

U.S. PATENT DOCUMENTS

| | | | |
|---|---|---|---|
| 6,783,326 B2 * | 8/2004 | Weitkamp et al. ................ | 416/1 |
| 7,470,111 B2 * | 12/2008 | Schubert ........................ | 416/155 |
| 7,866,946 B2 * | 1/2011 | Nitzpon ........................... | 416/1 |
| 2011/0012360 A1 * | 1/2011 | Numajiri ......................... | 290/55 |

FOREIGN PATENT DOCUMENTS

JP    2005-030263    2/2005

* cited by examiner

*Primary Examiner* — Edward Look
*Assistant Examiner* — Woody A Lee, Jr.
(74) *Attorney, Agent, or Firm* — Crowell & Moring LLP (57) ABSTRACT

The object of the invention is to construct a horizontal-axis wind turbine comprising a dual-system pitch drive unit for one blade that is independent up to the transmission mechanism or a dual-system yaw drive unit for one wind turbine nacelle that is independent up to the transmission mechanism, and to provide the dual system with new applicability. The horizontal-axis wind turbine of the present invention has a hub 1 and a blade 2 that are connected by way of an interposed section 5*b*, 6*b*, 7 which can freely rotate around the pitch axis of the blade with respect to both the hub and the blade; and further comprises: a hub-side interposed section drive unit 10 that relatively rotates the interposed section with respect to the hub, and a blade-side interposed section drive unit 11 that relatively rotates the blade with respect to the interposed section. The horizontal-axis wind turbine further comprises a hub-side interposed section angle sensor, a blade-side interposed section angle sensor and hub-side blade angle sensor, and is configured to control the pitch angle of the blade with respect to the hub whether controlling both drive units or controlling only one drive unit. Similar connection mechanism and drive and control mechanism is applied to between a tower and a nacelle.

6 Claims, 6 Drawing Sheets

HORIZONTAL AXIS WIND TURBINE

CROSS REFERENCE TO RELATED APPLICATIONS

This application claims priority under 35 U.S.C. 119 based upon Japanese Patent Application No. 2009-124132, filed on May 22, 2009. The entire disclosure of the aforesaid application is incorporated herein by reference.

FIELD OF THE INVENTION

The present invention relates to a horizontal-axis wind turbine, and more particularly to pitch drive control and yaw drive control technology.

BACKGROUND OF THE INVENTION

As is well known, so-called horizontal-axis wind turbines are widely used in industry such as for wind-generated electricity. A horizontal-axis wind turbine comprises a rotor having one or more blades that are radially attached to a hub, a nacelle that is connected to the hub and supports the axle of the rotor via a main shaft that extends in the horizontal direction, and a tower that is erected in a vertical direction, supports the nacelle so that it has free yaw rotation.

Conventionally, variable pitch type horizontal-axis wind turbines that drive and control the pitch angle of the blades have been used. As a variable pitch type wind turbines there is the interlocked type in which the pitch angles of all of the blades are mechanically linked and controlled together by a link mechanism, as well as recently independent variable pitch type horizontal-axis wind turbines having a pitch drive control system for each blade that can independently control the pitch angle for each blade have been used. In an independent variable pitch type horizontal-axis wind turbine, it is possible to prevent over rotation of the rotor and maintain safety in strong wind by feathering one or more or all of the blades even when a pitch drive device for one of the blades is broken.

On the other hand, in regards to yaw control, a yaw drive control device that can freely control the drive of the yaw rotation of the nacelle and therefore the rotor, and a yaw brake that brakes the yaw rotation have conventionally been used in horizontal-axis wind turbines.

In patent document 1 (Japanese Unexamined Patent Application Publication No. 2005-30263) a pitch angle control device for the wind turbine blades is disclosed that, by providing a sub motor in addition to a main motor, is capable of maintaining safe operation of the wind turbine when the main motor or its control unit fails, even during strong winds, by operating the sub motor and rotating the wind turbine blades to the point of feathering.

However, even the conventional technology had the following problems.

In the pitch angle control device disclosed in patent document 1, part of the transmission mechanism for transmitting drive force to the blades is shared by both the main motor and sub motor. In other words, in FIG. 1 of patent document 1, a gear reducer, the output shaft thereof, and the external gear that is connected to the output shaft, and an internal gear that are provided for the blades and engages with the external gear are a transmission mechanism that is shared by the main motor and sub motor.

Therefore, when some kind of foreign matter gets caught in the section where the gears engage and the shared transmission mechanism becomes inoperable, pitch control become impossible, and both the main motor and sub motor become useless.

Even in the case where a sub motor system as disclosed in patent document 1 is applied to the yaw drive of the nacelle, the same problem occurs as long as there is a shared transmission mechanism.

In a sub motor system as disclosed in patent document 1, the use of the sub motor is limited to the feathering of the blades when the main motor fails and there is a strong wind, and thus, it is lacking in the applicability of having two motors.

Furthermore, there is another problem in that in the objects to be driven such as the blades or nacelle, or the ring gear that is fastened to the base section such as the hub or tower, not all of the gear teeth are equally used, so the teeth in a limited angular range quickly wear out, shortening the life of the gears.

Considering the problems with the conventional technology, the object of the present invention is to provide a horizontal-axis wind turbine comprising a dual pitch drive mechanism that is independent up to the transmission mechanism for one blade, or a dual yaw drive mechanism that is independent up to the transmission mechanism for one turbine nacelle, and provides new usability of a dual drive system.

SUMMARY OF THE INVENTION

According to a first embodiment of the present invention for solving the problems described above, there is provided a horizontal-axis wind turbine comprising a rotor having a hub and one or more blades, and a pitch control mechanism for driving and controlling the pitch angle of the blades independently; wherein the hub and a blade are connected by an interposed section which can freely rotate around the pitch axis of the blade with respect to both the hub and the blade; and the pitch control mechanism includes: a hub-side interposed section drive unit that relatively rotates the interposed section with respect to the hub, and a blade-side interposed section drive unit that relatively rotates the blade with respect to the interposed section.

According to a second embodiment of the present invention, there is provided the horizontal-axis wind turbine of the first embodiment, wherein the pitch control unit for controlling the pitch control mechanism, the pitch control unit being configured to control the angle of the blade around the pitch axis with respect to the hub whether controlling both or just one of the hub-side interposed section drive unit and blade-side interposed section drive unit for one blade.

According to a third embodiment of the present invention, there is provided the horizontal-axis wind turbine of the second embodiment, further comprising a hub-side interposed section angle sensor that detects the angle of the interposed section around the pitch axis with respect to the hub, and a blade-side interposed section angle sensor that detects the angle of the blade around the pitch axis with respect to the interposed section; wherein the pitch control unit is configured to control the angle of the blade around the pitch axis with respect to the hub whether controlling both or just one of the hub-side interposed section drive unit and blade-side interposed section drive unit based on the detected value from the hub-side interposed section angle sensor and the detected value from the blade-side interposed section angle sensor.

According to a fourth embodiment of the present invention, there is provided the horizontal-axis wind turbine of the second embodiment, further comprising a hub-side blade angle sensor that directly detects the angle of the blade around the pitch axis of the blade with respect to the hub; wherein the pitch control unit is configured to control the angle around the pitch axis of the blade with respect to the hub whether controlling both or just one of the hub-side interposed section drive unit and blade-side interposed section drive unit based on the detected value from the hub-side blade angle sensor.

According to a fifth embodiment of the present invention, there is provided the horizontal-axis wind turbine of the third embodiment, further comprising a hub-side blade angle sensor that directly detects the angle of the blade around the pitch axis of the blade with respect to the hub; wherein the pitch control unit is configured to control the angle around the pitch axis of the blade with respect to the hub whether controlling both or just one of the hub-side interposed section drive unit and blade-side interposed section drive unit based on the detected value from the hub-side blade angle sensor.

According to a sixth embodiment of the present invention, there is provided the horizontal-axis wind turbine of the first embodiment, wherein each of the hub-side interposed section drive unit and the blade-side interposed section drive unit includes a ring gear that is fastened to the hub, the interposed section or the blade and arranged with the pitch axis being a center axis thereof and a gear that engages with the ring gear, as the transmission mechanism section; and the horizontal-axis wind turbine further comprising: a gear engagement position control unit for controlling both the hub-side interposed section drive unit and blade-side interposed section drive unit so that a direction of relative rotation of the interposed section with respect to the hub, and a direction of relative rotation of the blade with respect to the interposed section are in opposite directions, and changes the gear engagement position of the ring gear and the gear by that offset amount.

According to a seventh embodiment of the present invention, there is provided a horizontal-axis wind turbine comprising a rotor having a hub and one or more blades, a nacelle that supports the rotor by way of a shaft that is connected to the hub so that the rotor can rotate freely, a tower that supports the nacelle such that the nacelle is capable of free yaw rotation, and a yaw control mechanism for driving and controlling a yaw angle of the nacelle; wherein the hub and the nacelle are connected by an interposed section which can freely rotate around the yaw axis of the nacelle with respect to both the tower and the nacelle; and said yaw control mechanism includes: a tower-side interposed section drive unit that relatively rotates the interposed section with respect to the tower, and a nacelle-side interposed section drive unit that relatively rotates the nacelle with respect to the interposed section.

According to an eighth embodiment of the present invention, there is provided the horizontal-axis wind turbine of the seventh embodiment, further comprising a yaw control unit for controlling the yaw control mechanism, the yaw control unit being configured to control an angle of the nacelle around the yaw axis with respect to the tower whether controlling both or just one of the tower-side interposed section drive unit and nacelle-side interposed section drive unit for one blade.

According to a ninth embodiment of the present invention, there is provided the horizontal-axis wind turbine of the eighth embodiment, further comprising a tower-side interposed section angle sensor that detects the angle of the interposed section around the yaw axis with respect to the tower, and a nacelle-side interposed section angle sensor that detects the angle of the nacelle around the yaw axis with respect to the interposed section; wherein the yaw control unit is configured to control the angle of the nacelle around the yaw axis with respect to the tower whether controlling both or just one of the tower-side interposed section drive unit and nacelle-side interposed section drive unit based on the detected value from the tower-side interposed section angle sensor and the detected value from the nacelle-side interposed section angle sensor.

According to a tenth embodiment of the present invention, there is provided the horizontal-axis wind turbine of the eighth embodiment, further comprising a tower-side nacelle angle sensor that directly detects the angle of the nacelle around the yaw axis with respect to the tower; wherein the yaw control unit is configured to control the angle of the nacelle around the yaw axis with respect to the tower whether controlling both or just one of the tower-side interposed section drive unit and nacelle-side interposed section drive unit based on the detected value from the tower-side nacelle angle sensor.

According to an eleventh embodiment of the present invention, there is provided the horizontal-axis wind turbine of the ninth embodiment, further comprising a tower-side nacelle angle sensor that directly detects the angle of the nacelle around the yaw axis with respect to the tower; wherein the yaw control unit is configured to control the angle of the nacelle around the yaw axis with respect to the tower whether controlling both or just one of the tower-side interposed section drive unit and nacelle-side interposed section drive unit based on the detected value from the tower-side nacelle angle sensor.

According to a twelfth embodiment of the present invention, there is provided the horizontal-axis wind turbine of the seventh embodiment, wherein each of the tower-side interposed section drive unit and the nacelle-side interposed section drive unit includes a ring gear that is fastened to the tower, the interposed section or the nacelle and arranged with the yaw axis being a center axis thereof, and a gear that engages with the ring gear as the transmission mechanism section; and the horizontal-axis wind turbine further comprising a gear engagement position control unit for controlling both the tower-side interposed section drive unit and nacelle-side interposed section drive unit so that a direction of relative rotation of the interposed section with respect to the tower and a direction of relative rotation of the nacelle with respect to the interposed section are in opposite directions, and changes the gear engagement position of the ring gear and the gear by that offset amount.

The invention according to the first to sixth embodiments comprises: a hub and blade that are linked by way of an interposed section that rotates freely around the pitch axis of the blade with respect to both the hub and blade, a hub-side interposed section drive unit that rotates the interposed section relative to the hub and a blade-side interposed section drive unit that rotates the blade relative to the interposed section, so for one blade, a dual-system pitch drive device is provided that is independent up to the transmission mechanism.

Therefore, the present invention has the advantage in that not only when a problem occurs in one of the drive sources of the dual-system pitch drive device or control system thereof, but also when a problem occurs in the drive force transmission mechanism causing it to become inoperable, it is possible to drive and control the pitch angle of the blade using the other pitch drive device. Therefore, even though one of the pitch drive devices becomes inoperable, it is possible to continue operating the rotor to generate electric power, and it is possible to perform the strong wind idling operation that feathers the blades during strong winds.

Moreover, when both the hub-side interposed section drive device and blade-side interposed section drive device are in good condition, it is possible to control the pitch angle of a blade by controlling both.

In addition, by providing a gear engagement position control unit, it is possible to change the gear engagement position of the ring gears and gears that engage with the ring gears without affecting control of the pitch angle of a blade, and thus it is possible to suppress uneven wear of the gears and to lengthen the life of the gears.

It is preferred that a hub-side interposed section angle sensor and a blade-side interposed angle sensor, or that a hub-side blade angle sensor be employed as the angle sensors used. When using a hub-side blade angle sensor, it is possible to more accurately detect the pitch angle of the blade. It is also possible to use all three of these angle sensors. In that case, when a problem occurs in one system, it is possible to perform pitch angle control of the blade by compensating with the other system.

The invention according to the seventh to twelfth embodiments comprises: a tower and nacelle that are linked by way of an interposed section that can freely rotate around the yaw axis of the nacelle with respect to both the tower and the nacelle, a tower-side interposed section drive unit that rotates the interposed section relative to the tower, and a nacelle-side interposed section drive unit that rotates the nacelle relative to the interposed section, so for one wind turbine nacelle, a dual-system yaw drive device is provided that is independent up to the transmission mechanism.

Therefore, the present invention has the advantage in that not only when a problem occurs in one of the drive sources of the dual-system yaw drive device or control system thereof, but also when a problem occurs in the drive force transmission mechanism causing it to become inoperable, it is possible to drive and control the yaw angle of the nacelle using the other yaw drive device. Therefore, even though one of the yaw drive devices becomes inoperable, it is possible to perform control so that the rotor is in a desired direction (mainly in a direction opposite to the wind) while operating the rotor to generate electric power, or while idling during strong winds when operation is stopped.

Moreover, when both the tower-side interposed section drive device and nacelle-side interposed section drive device are in good condition, it is possible to control the yaw angle of a nacelle by controlling both.

In addition, by providing a gear engagement position control unit, it is possible to change the gear engagement position of the ring gears and gears that engage with the ring gears without affecting control of the yaw angle of the nacelle, and thus it is possible to suppress uneven wear of the gears and to lengthen the life of the gears.

It is preferred that a tower-side interposed section angle sensor and a nacelle-side interposed angle sensor, or that a tower-side nacelle angle sensor be employed as the angle sensors used. When using a tower-side nacelle angle sensor, it is possible to more accurately detect the yaw angle of the nacelle. It is also possible to use all three of these angle sensors. In that case, when a problem occurs in one system, it is possible to perform yaw angle control of the nacelle by compensating with the other system.

DETAILED DESCRIPTION OF THE INVENTION

The preferred embodiment of the present invention will be explained below with reference to the accompanying drawings. The following is a preferred embodiment of the present invention and does not limit the invention.

Figure 1:
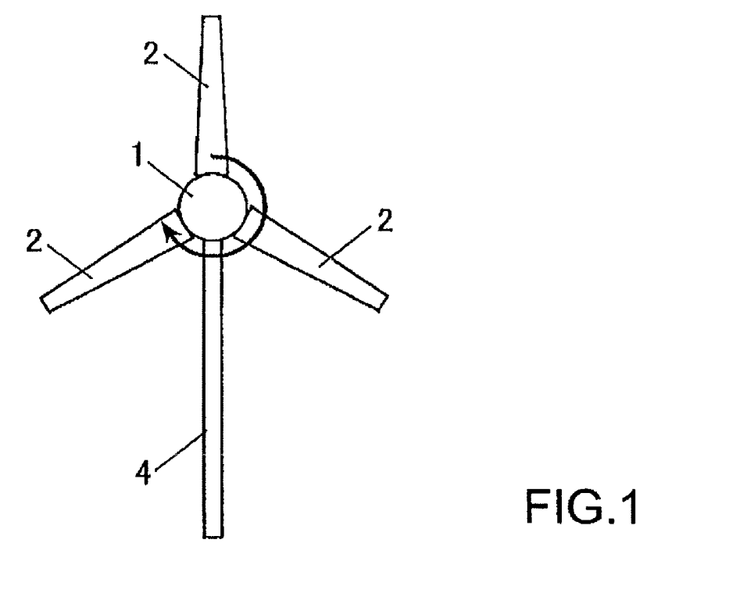
FIG. 1 is a front view of a horizontal-axis wind turbine of an embodiment of the present invention.

The horizontal-axis wind turbine of this embodiment as shown in FIG. 1 comprises a rotor having a hub 1 and blades 2. The rotor of this embodiment is a rotor having three blades 2. The number of the blades of the rotor to which the present invention can be applied can be one blade or two or more blades.

The horizontal-axis wind turbine of this embodiment further comprises a nacelle 3 (see FIG. 10) that supports the rotor by way of a main shaft (not shown in the figure) that is connected to the hub 1 such that it can rotate freely, and a tower 4 that supports the nacelle 3 such that yaw rotation is possible.

Next, the pitch drive-control mechanism of this embodiment will be explained.

Figure 2:
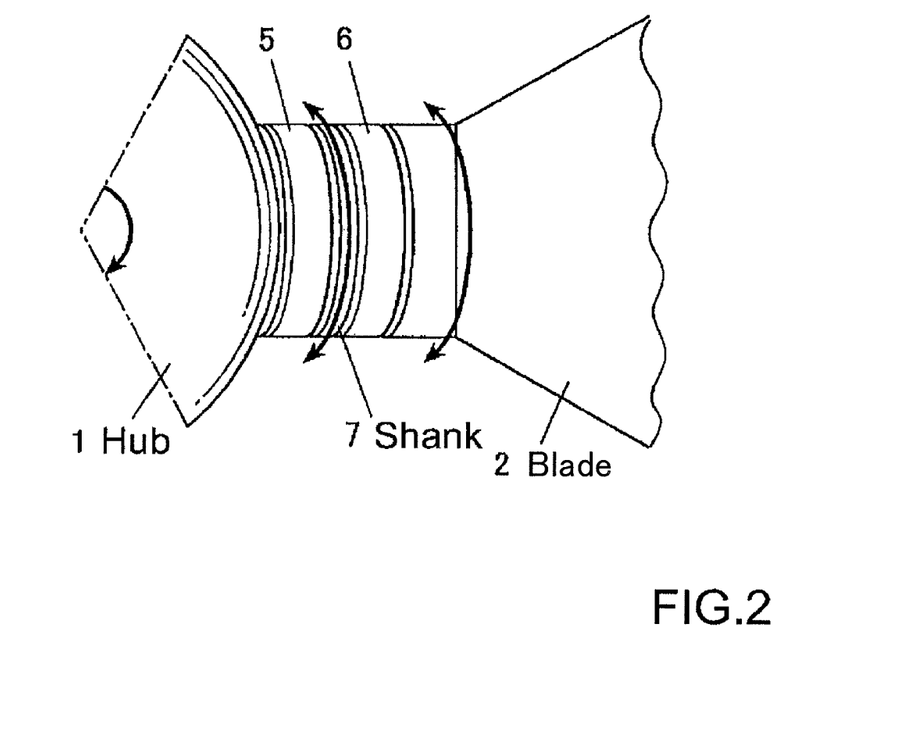
FIG. 2 is a partial enlarged view of the connection section between the hub and a blade of a horizontal-axis wind turbine of an embodiment of the present invention.
Figure 3:
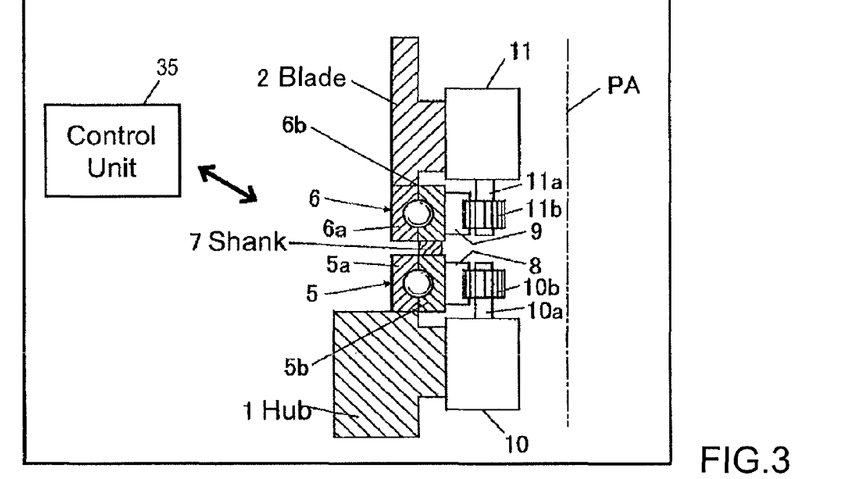
FIG. 3 is a partial cross-sectional drawing of a cross section of the connection section between the hub and blade taken through the pitch axis of a horizontal-axis wind turbine of an embodiment of the present invention, and shows the pitch drive mechanism.

As illustrated in FIG. 2 and FIG. 3, an internal ring gear 8 is attached to the hub 12 by way of a bearing unit 5, and an internal ring gear 9 is attached to a blade 2 by way of a bearing unit 6. The bearing units 5, 6 and ring gears 8, 9 are coaxially located around the pitch axis PA of the blade 2.

The outer race section 5a of the bearing unit 5 is fastened to the hub 1, the outer race 6a of the bearing unit 6 is fastened to the blade 2, and the inner race 5b of the bearing unit 5 and the inner race 6b of the bearing unit 6 are fastened together by way of a shank 7. The shank 7 is a ring-shaped connection part, and is used when necessary. As known, bearings are held between the outer races 5a (6a) and inner races 5b (6b) so that relative rotation is possible.

As can be seen from the explanation above, the integrated section that comprises the inner race 5b, inner race 6b and shank 7 forms an interposed section that can rotate freely around the pitch axis PA of the blade 2 with respect to both the hub 1 and blade 2. The hub 1 and blade 2 are connected by way of this interposed section 5b, 6b, 7.

A hub-side interposed section drive unit (pitch drive-control mechanism) that rotates the interposed section 5b, 6b, 7 relative to the hub 1 comprises the ring gear 8 and motor 10, etc. The ring gear 8 is a ring-shaped internal gear that is fastened to the inside of the inner race 5b. The body of the motor 10 is fastened to the hub 1, and a pinion gear 10b that is installed on the output shaft 10a of the motor 10 engages with the ring gear 8.

A blade-side interposed section drive unit (pitch drive-control mechanism) that rotates the blade 2 relative to the interposed section 5b, 6b, 7 comprises a ring gear 9 and motor 11, etc. The ring gear 9 is a ring-shaped internal gear that is fastened to the inside of the inner race 6b. The body of the motor 11 is fastened to the blade 2, and a pinion gear 11b that is installed on the output shaft 11a of the motor 11 engages with the ring gear 9.

Figure 4:
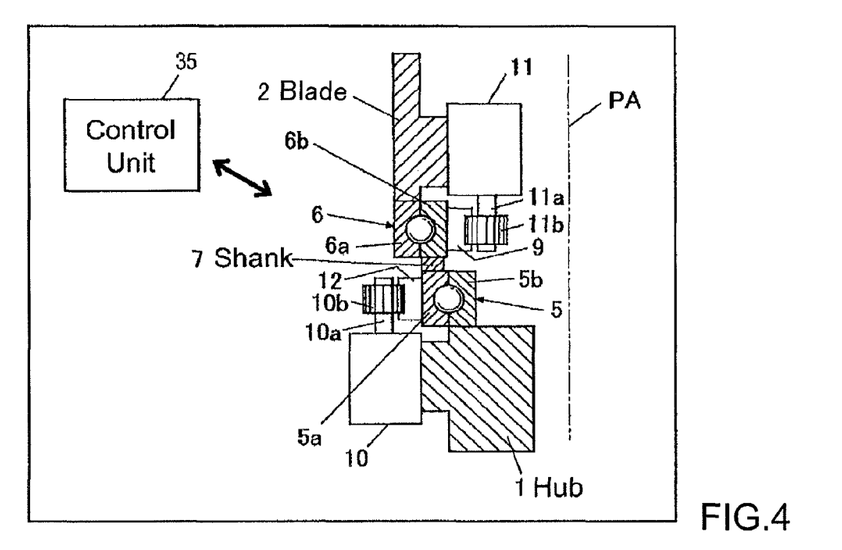
FIG. 4 is a partial cross-sectional drawing of a cross section of the connection section between the hub and a blade taken through the pitch axis of a horizontal-axis wind turbine of an embodiment of the present invention, and shows the arrangement of pitch drive mechanism that differs from that of FIG. 3.

In this embodiment, as shown in FIG. 3, the hub-side interposed section drive unit and blade-side interposed section drive unit were arranged on the inside of the hub 1, blade 2 and bearing units 5, 6, however, it is possible to apply other various arrangements such as locating one or both on the outside. FIG. 4 is an example of arranging the hub-side interposed section drive unit on the outside. In the example of FIG. 4, the outer race 5a of the bearing unit 5, the inner race 6b of the bearing unit 6 and the shank 7 are integrated together to form an interposed section, an external ring gear 12 is fastened to the outside of the outer race 5a and the ring gear 12 engages with the pinion gear 10b of the motor 10.

Figure 5:
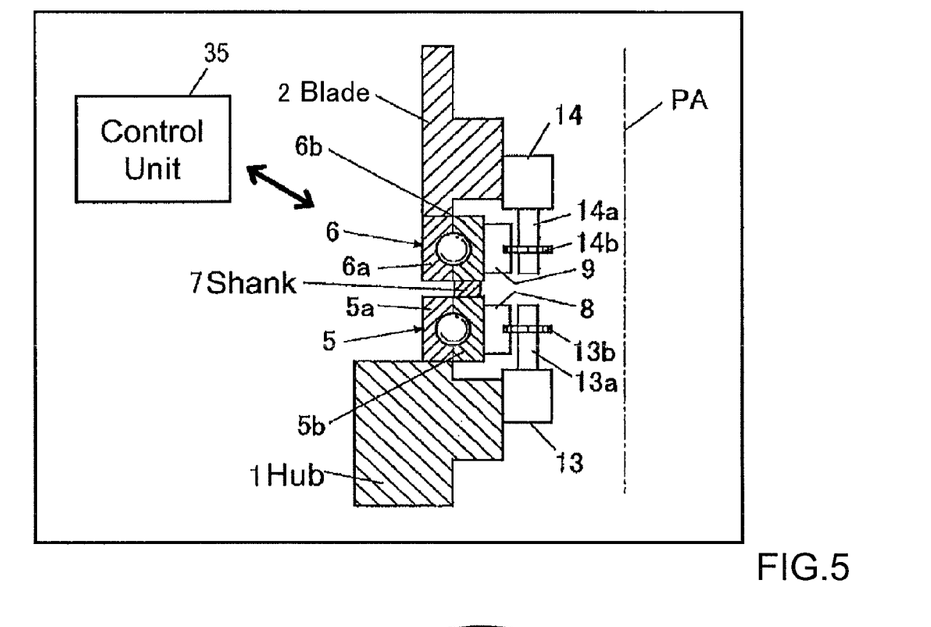
FIG. 5 is a partial cross-sectional drawing of a cross section of the connection section between the hub and a blade taken through the pitch axis of a horizontal-axis wind turbine of an embodiment of the present invention, and shows a hub-side interposed section angle sensor, and a blade-side interposed section angle sensor.

Furthermore, as illustrated in FIG. 5, the horizontal-axis wind turbine of this embodiment comprises: a hub-side interposed section angle sensor 13, which detects the angle of the interposed section 5b, 6b, 7 around the pitch axis PA with respect to the hub, and a blade-side interposed section angle sensor 14, which detects the angle of the blade 2 around the pitch axis PA with respect to the interposed section 5b, 6b, 7.

The angle sensors 13, 14 are both rotary encoders. The body of the angle sensor 13 is fastened to the hub 1. A pinion gear 13b that is installed on the input shaft 13a of the angle sensor 13 engages with the ring gear 8. The body of the angle sensor 14 is fastened to the blade 2. A pinion gear 14b that is installed on the input shaft 14a of the angle sensor 14 engages with the ring gear 9. The input shafts 13a, 14a are driven and rotated by the ring gears 8, 9, and the angle sensors 13, 14 output signals that correspond to the respective amount of rotation.

Figure 6:
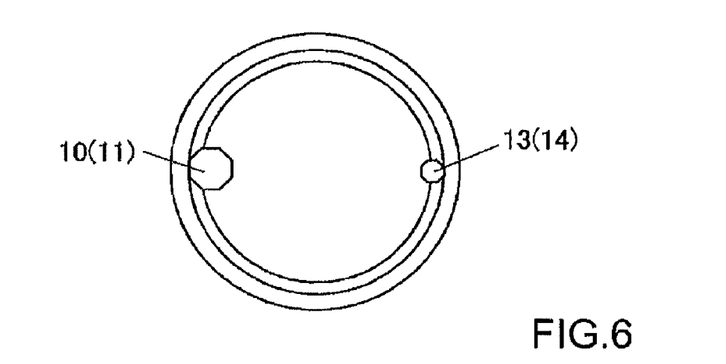
FIG. 6 is a cross-sectional drawing of a cross section of the connection section between the hub and a blade taken perpendicular to the pitch axis of a horizontal-axis wind turbine of an embodiment of the present invention.

In order that there is no interference between the motor 10 and angle sensor 13 and between the motor 11 and angle sensor 14, they may be arranged at different angular positions as shown in FIG. 6, for example.

Figure 7:
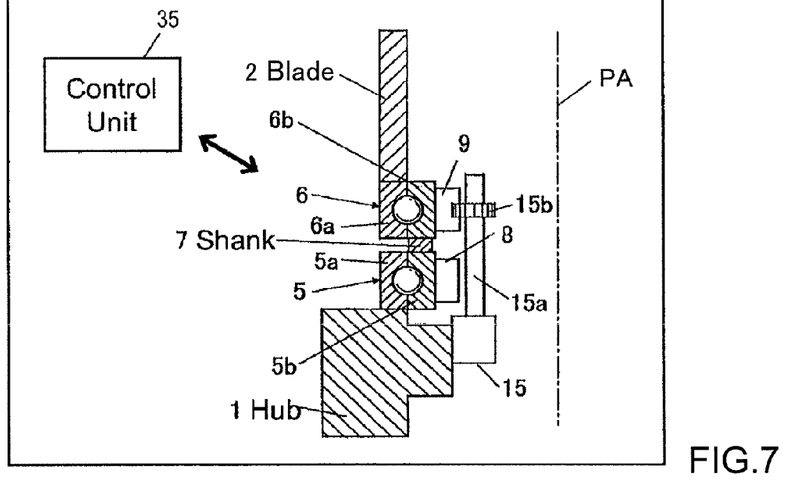
FIG. 7 is a partial cross-sectional drawing of a cross section of the connection section between the hub and a blade of a horizontal-axis wind turbine of an embodiment of the present invention taken through the pitch axis, and shows a hub side blade angle sensor.

Moreover, as shown in FIG. 7, the horizontal-axis wind turbine of this embodiment comprises a hub-side blade angle sensor 15 that directly detects the angle of the blade 2 around the pitch axis PA of the blade 2 with respect to the hub 1. The angle sensor 15 is a rotary encoder. The body of the angle sensor 15 is fastened to the hub 1. A pinion gear 15b that is installed on the input shaft 15a of the angle sensor 15 engages with the ring gear 9. The input shaft 15a is driven and rotated by the ring gears 8, 9, and the angle sensor 15 outputs a signal that corresponds to that amount of rotation.

In order that the angle sensor 15 does not interfere with the motors 10, 11, and with the angle sensors 13, 14, it is located at a different angular position.

The hub-side blade angle sensor 15 may be used instead or together with the hub-side interposed section angle sensor 13 and blade-side interposed section angle sensor 14.

Furthermore, a control unit 35 (a representative example shown in FIG. 3) is installed in the horizontal-axis wind turbine of this embodiment. The control unit 35 comprises a pitch control means (pitch control unit) and a gear engagement position control means (gear engagement position control unit), and executes the control operations described below.

The control unit 35 functions as a pitch control unit.

By adding up detected values from the hub-side interposed section angle sensor 13 and the blade-side interposed section angle sensor 14, the control unit 35 calculates the angle of the blade 2 around the pitch axis PA with respect to the hub 1, or in other words, the pitch angle of the blade 2. The control unit 35 also calculates the pitch angle of the blade 2 based on the detected value from the hub-side blade angle sensor 15.

When performing control to change the angle of the blade 2 to a target pitch angle, the control unit 35 controls both or either one of the hub-side interposed section drive unit (motor 10) and the blade-side interposed section drive unit (motor 11) so that the pitch angle of the blade 2 that is calculated as described above becomes the target pitch angle. When controlling both drive units, the control unit 35 distributes the amount to change the angle by a 1:1 shared ratio. When controlling either one of the drive units, the control unit 35 alternately uses one of the drives by alternating the drive unit after every specified time interval or after every specified drive amount. Through this control, it is possible to evenly use the hub-side interposed section drive unit (motor 10) and the blade-side interposed section drive unit (motor 11).

In this embodiment, three angle sensors 13, 14, 15 are used, so even when the angle sensors 13, 14 break down or do not indicate accurate values, the control unit 35 can obtain the pitch angle of the blade 2 from the angle sensor 15, and likewise, when the angle sensor 15 breaks down or does not indicate an accurate value, the control unit 35 can obtain the pitch angle of the blade 2 from the angle sensors 13, 14.

In addition, when the control unit 35 is in the control mode for controlling both the hub-side interposed section drive unit (motor 10) and the blade-side interposed section drive unit (motor 11), and it becomes impossible to operate one of the hub-side interposed section drive unit (motor 10) and the blade-side interposed section drive unit (motor 11), the control unit 35 switches to the control mode for controlling the pitch angle of the blade 2 by just controlling the operable drive unit.

Moreover, when the control unit 35 is in the control mode for controlling the pitch angle of the blade 2 by controlling just the hub-side interposed section drive unit (motor 10), and operation of the hub-side interposed section drive unit (motor 10) becomes impossible, the control unit 35 switches to the control mode for controlling the pitch angle of the blade 2 by controlling just the operable blade-side interposed section drive unit (motor 11).

Furthermore, when the control unit 35 is in the control mode for controlling the pitch angle of the blade 2 by controlling just the blade-side interposed section drive unit (motor 11), and operation of the blade-side interposed section drive unit (motor 11) becomes impossible, the control unit 35 switches to the control mode for controlling the pitch angle of the blade 2 by controlling just the operable hub-side interposed section drive unit (motor 10).

Figure 8:
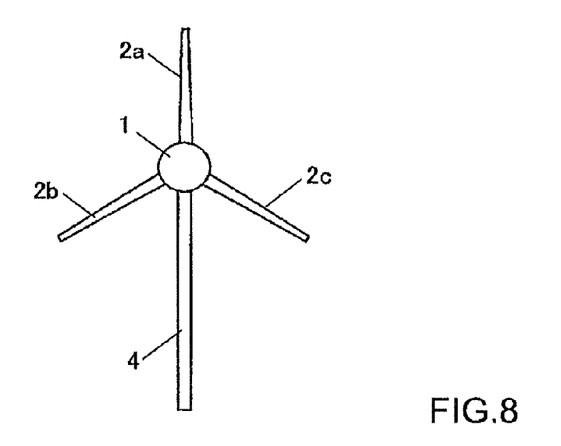
FIG. 8 is a front view that shows the strong-wind idling state when there is partial failure of the horizontal-axis wind turbine of an embodiment of the present invention.

In one form of control, when one of the hub-side interposed section drive unit (motor 10) and blade-side interposed section drive unit (motor 11) becomes inoperable, the control unit 35 switches to the necessary control mode as described above, and continues normal operation of the wind turbine, and during strong winds when the wind turbine must be idled, feathers the blades 2, 2, 2 as illustrated in FIG. 8 as idling operation during strong wind.

In another form of control, when one of the hub-side interposed section drive unit (motor 10) and blade-side interposed section drive unit (motor 11) cannot be operated, the control unit 35 switches to the necessary control mode as described above, feathers the blades 2, 2, 2 as illustrated in FIG. 8 and waits until the cause of the trouble is eliminated by maintenance personnel.

Figure 9:
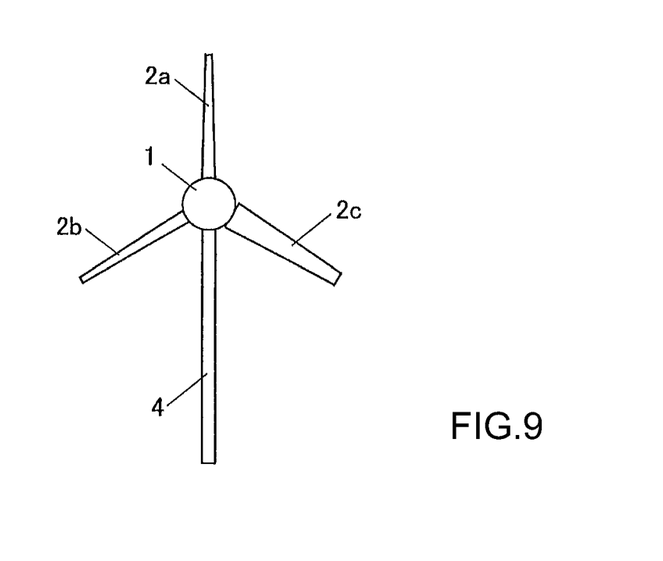
FIG. 9 is a front view that shows the high-wind idling state when there is partial failure of a conventional horizontal-axis wind turbine.

In a conventional pitch drive control system, when the wind turbine becomes disabled during operation, continuing normal operation of the wind turbine becomes difficult from the aspect of the decrease in efficiency and increase in load, and as shown in FIG. 9, it is not possible for the pitch drive control system to feather the blade 2c that became disabled, and even though the other blades 2a, 2b are feathered to idle, the relatively large load remains on the wind turbine.

However, in this embodiment, as long as one of the hub-side interposed section drive unit (motor 10) and blade-side interposed section drive unit (motor 11) is operable, it is possible to continue normal operation of the wind turbine, as well as it is possible to feather the blades 2, 2, 2 and to improve the rate of operation and maintainability of the wind turbine.

The control unit 35 also functions as a gear engagement position control unit.

The control unit controls both the hub-side interposed section drive unit (motor 10) and the blade-side interposed section drive unit (motor 11) so that the direction of relative rotation of the interposed section 5b, 6b, 7 with respect to the hub 1 is opposite the direction of relative rotation of the blade 2 with respect to the interposed section 5b, 6b, 7, and performs control to change the engagement position of the ring gear 8 and the pinion gear 10b, and the engagement position of the ring gear 9 and pinion gear 11b by that offset amount.

By relatively rotating the interposed section 5b, 6b, 7 with respect to the hub 1, while at the same time relatively rotating the blade 2 with respect to the interposed section 5b, 6b, 7 by the same amount in the opposite direction, it is possible to rotate just the interposed section 5b, 6b, 7 without changing the relative angle of the blade 2 with respect to the hub 1, or in other words, without changing the pitch angle of the blade 2.

According to the underlying principle, it is possible to change the engagement positions of the ring gears 8, 9 and the engaging gears 10b, 11b without affecting the control of the pitch angle of the blades, and this it is possible to suppress uneven wear of the gears and to lengthen the usable life of the gears.

Next, yaw drive-control mechanism of this embodiment will be explained.

Figure 10:
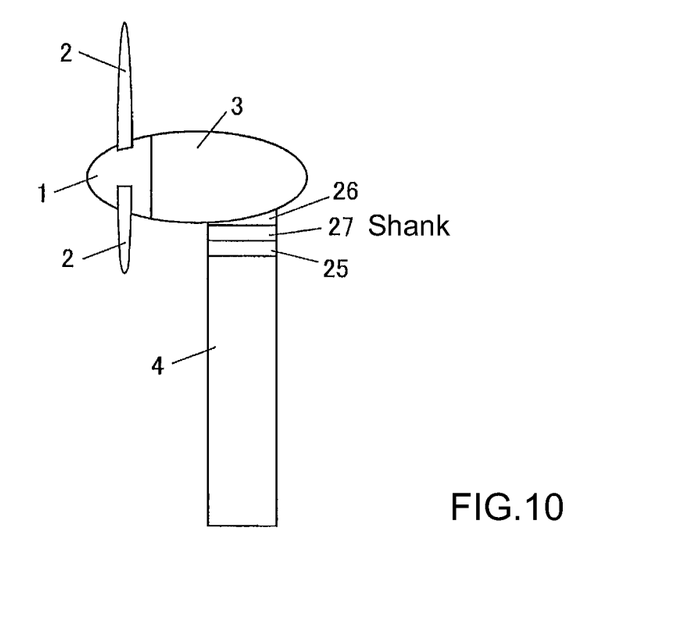
FIG. 10 is a side view of the horizontal-axis wind turbine of an embodiment of the present invention.
Figure 11:
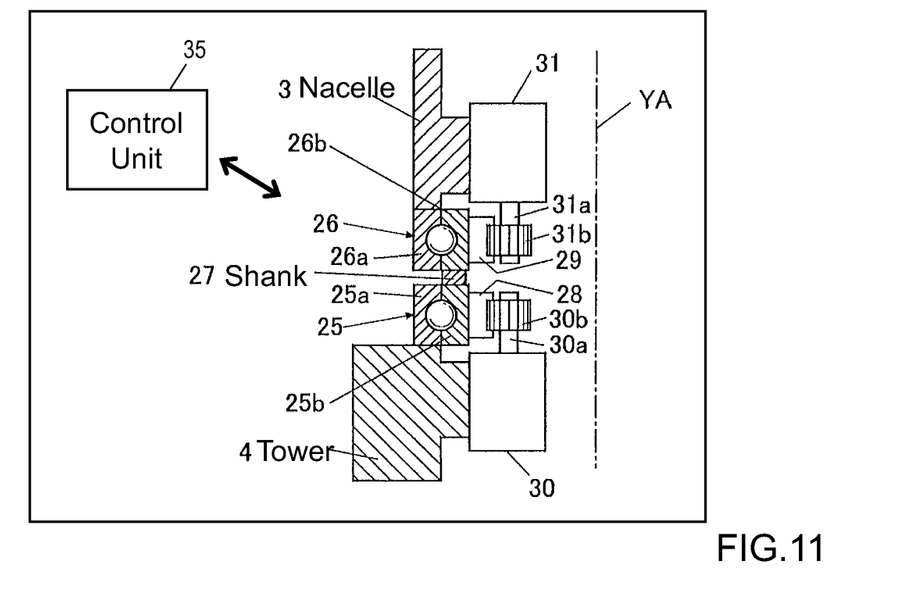
FIG. 11 is a partial cross-sectional drawing of the connection section between the tower and nacelle taken through the yaw axis of the horizontal-axis wind turbine of an embodiment of the present invention, and shows the yaw drive mechanism.

As shown in FIG. 10 and FIG. 11, an internal ring gear 28 is installed at the top end of the tower 4 by way of a bearing unit 25, and an internal ring gear 29 is installed on the nacelle 3 by way of a bearing unit 26. The bearing units 25, 26 and the ring gears 28, 29 are coaxially arranged around the yaw axis YA of the nacelle 3.

The outer race 25a of the bearing unit 25 is fastened to the tower 4, and the outer race 26a of the bearing unit 26 is fastened to the nacelle 3, and the inner race 25b of the bearing unit 25 and the inner race 26b of the bearing unit 26 are fastened together by way of a shank 27. The shank 27 is a ring-shaped connection part, and is used as necessary. As is well known, bearings are held between the outer races 25a (26a) and the inner races 25b (26b) of the bearing units 25 (26) such that there is relative rotation.

As can be seen from the explanation above, the integrated section that is formed from the inner race 25b, inner race 26b and shank 27 forms an interposed section that can rotate freely around the yaw axis YA of the nacelle 3 with respect to both the tower 4 and the nacelle 3. The tower 4 and nacelle 3 are connected by way of the interposed section 25b, 26b, 27.

A tower-side interposed section drive unit that rotates the interposed section 25b, 26b, 27 relative to the tower 4 comprises a ring gear 28 and motor 30, etc. The ring gear 28 is an internal ring-shaped gear that is fastened to the inside of the inner race 25b. The body of the motor 30 is fastened to the tower 4, and a pinion gear 30b that is installed on the output shaft 30a of the motor 30 engages with the ring gear 28.

A nacelle-side interposed section drive unit that rotates the nacelle 3 relative to the interposed section 25b, 26b, 27 comprises a ring gear 29 and motor 31, etc. The ring gear 29 is an internal ring-shaped gear that is fastened to the inside of the inner race 26b. The body of the motor 31 is fastened to the nacelle 3, and a pinion gear 31b that is installed on the output shaft 31a of the motor 31 engages with the ring gear 29.

In this embodiment, the tower-side interposed section drive unit and nacelle-side interposed section drive unit are arranged on the inside of the tower 4, nacelle 3 and bearing units 25, 26 as illustrated in FIG. 11, however, it is possible to use other various arrangements such as locating one or both on the outside. Similar to the illustration of FIG. 4 (by replacing the hub 1 with the tower 4, and the blade 2 with the nacelle 3 in FIG. 4), the tower-side interposed section drive unit can be located on the outside.

Moreover, similar to the construction shown in FIG. 5 (by replacing the hub 1 with the tower 4, and the blade 2 with the nacelle 3), the horizontal-axis wind turbine of this embodiment comprises a tower-side interposed section angle sensor 33 that detects the angle of the interposed section 25b, 26b, 27 around the yaw axis YA with respect to the tower 4, and a nacelle-side interposed section angle sensor 34 that detects the angle of the nacelle 3 around the yaw axis YA with respect to the interposed section 25b, 26b, 27.

Figure 12:
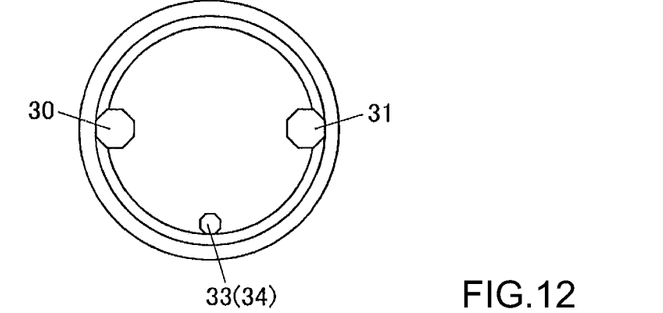
FIG. 12 is a cross-sectional drawing of a cross section of the connection section between the tower and the nacelle taken perpendicular to the yaw axis of a horizontal-axis wind turbine of an embodiment of the present invention.

As illustrated in FIG. 12, in order that there is no interference between the motor 30 and angle sensor 33, and the motor 31 and angle sensor 34, the motors 30, 31 and angle sensors 33, 34 can be located at different angular positions.

Furthermore, similar to the construction shown in FIG. 7 (by replacing the hub 1 with the tower 4, and the blade 2 with the nacelle 3), the horizontal-axis wind turbine of this embodiment comprises a tower-side nacelle angle sensor (not shown in the figure) that directly detects the angle of the nacelle 3 around the yaw axis YA with respect to the tower 4.

The tower-side nacelle angle sensor is located at a different angular position so that it does not interfere with the motors 30, 31 and angle sensors 33, 34.

The tower-side nacelle angle sensor can be used instead of or together with the tower-side interposed section angle sensor 33 and nacelle-side interposed section angle sensor 34.

A control unit 35 functions as a yaw control unit along with the yaw drive-control mechanism.

The control unit 35 calculates the angle of the nacelle 3 around the yaw axis with respect to the tower 4, or in other words, calculates the yaw angle of the nacelle 3 based on the sum of the detected value from the tower-side interposed section angle sensor 33 and the detected value from the nacelle-side interposed section angle sensor 34.

The control unit 35 also calculates the yaw angle of the nacelle 3 based on the detected value from the tower-side nacelle angle sensor.

When performing control to change the angle of the nacelle 3 to a target yaw angle, the control unit 35 controls both or just one of the tower-side interposed section drive unit (motor 30) and nacelle-side interposed section drive unit (motor 31) so that the yaw angle of the nacelle 3, which is calculated as described above, becomes the target angle. When the control unit 35 controls both, the amount of angle change is distributed among both at a sharing ratio of 1:1. When controlling only one, the control unit 35 alternately uses each drive unit by alternating the drive unit used after every specified time interval or specified total drive amount. Through this kind of control, it is possible to evenly use the tower-side interposed section drive unit (motor 30) and nacelle-side interposed section drive unit (motor 31).

In this embodiment, three angle sensors are used, so even in the case where the tower-side interposed section angle sensor 33 and nacelle-side interposed section angle sensor 34 break down or do not indicate the correct value, the control unit 35 is able to know the yaw angle of the nacelle 3 from the tower-side nacelle angle sensor, and conversely, when the tower-side nacelle angle sensor breaks down and does not indicate the correct value, the control unit 35 is able to know the yaw angle of the nacelle 3 from the tower-side interposed section angle sensor 33 and nacelle-side interposed section angle sensor 34.

In addition, when the control unit 35 is in the control mode for controlling both the tower-side interposed section drive unit (motor 30) and nacelle-side interposed section drive unit (motor 31), and one of the tower-side interposed section drive unit (motor 30) and nacelle-side interposed section drive unit (motor 31) becomes inoperable, the control unit 35 switches to the control mode for controlling the yaw angle of the nacelle 3 by controlling just the one operable drive unit.

Moreover, when the control unit 35 is in the control mode for controlling only the tower-side interposed section drive unit (motor 30) for controlling the yaw angle of the nacelle 3, and the tower-side interposed section drive unit (motor 30) becomes inoperable, the control unit 35 switches to the control mode for controlling the yaw angle of the nacelle 3 by just controlling the operable nacelle-side interposed section drive unit (motor 31).

Furthermore, when the control unit 35 is in the control mode for controlling only the nacelle-side interposed section drive unit (motor 31) for controlling the yaw angle of the nacelle 3, and the nacelle-side interposed section drive unit (motor 31) becomes inoperable, the control unit 35 switches to the control mode for controlling the yaw angle of the nacelle 3 by just controlling the operable tower-side interposed section drive unit (motor 30).

When one of the tower-side interposed section drive unit (motor 30) and nacelle-side interposed section drive unit (motor 31) becomes inoperable, the control unit 35 switches to one of the control modes described above as necessary and is able to continue normal operation of the wind turbine, and in the case of strong wind when idling is necessary, is able to perform the idling operation for strong wind. Therefore the rate of operation and maintainability of the wind turbine is improved.

Moreover, the control unit 35 functions as a gear engagement position control unit.

The control unit 35 controls both the tower-side interposed section drive unit (motor 30) and nacelle-side interposed section drive unit (motor 31) so that the direction of relative rotation of the interposed section 25b, 26b, 27 with respect to the tower 4 and the direction of relative rotation of the nacelle 3 with respect to the interposed section 25b, 26b, 27 are opposite directions, and according to that compensating amount, performs control to change the gear engagement position of the ring gear 28 and pinion gear 30b and gear engagement position of the ring gear 29 and pinion gear 31b.

By relatively rotating the interposed section 25b, 26b, 27 with respect to the tower 4, while at the same time relatively rotating the nacelle 3 with respect to the interposed section 25b, 26b, 27 by the same amount in the opposite direction, it is possible to rotate just the interposed section 25b, 26b, 27 without changing the relative angle of the nacelle 3 with respect to the tower 4, or in other words, without changing the yaw angle of the nacelle 3.

According to the underlying principle, it is possible to change the engagement positions of the ring gears 28, 29 and the engaging gears 30b, 31b without affecting the control of the yaw angle of the nacelle, and thus it is possible to suppress uneven wear of the gears and to lengthen the usable life of the gears.

What is claimed is:

1. A horizontal-axis wind turbine comprising:
a rotor having a hub and one or more blades;
a pitch control mechanism for driving and controlling a pitch angle of each of said blades independently;
wherein said hub and said blade are connected by an interposed section which can freely rotate around the pitch axis of said blade with respect to both said hub and said blade;
and said pitch control mechanism includes:
a hub-side interposed section drive unit that relatively rotates said interposed section with respect to said hub, and
a blade-side interposed section drive unit that relatively rotates said blade with respect to said interposed section;
a pitch control unit for controlling said pitch control mechanism, said pitch control unit being configured to control an angle of said blade around said pitch axis with respect to said hub whether controlling both or just one of said hub-side interposed section drive unit and blade-side interposed section drive unit for one blade;
a hub-side interposed section angle sensor that detects an angle of said interposed section around said pitch axis with respect to said hub, and
a blade-side interposed section angle sensor that detects an angle of said blade around said pitch axis with respect to said interposed section; wherein
said pitch control unit is configured to control an angle of said blade around said pitch axis with respect to said hub whether controlling both or just one of said hub-side interposed section drive unit and blade-side interposed section drive unit, based on the detected value from said hub-side interposed section angle sensor and the detected value from said blade-side interposed section angle sensor.

2. The horizontal-axis wind turbine according to claim 1, further comprising
a hub-side blade angle sensor that directly detects an angle of said blade around said pitch axis with respect to said hub; wherein
said pitch control unit is configured to control the angle of said blade around said pitch axis with respect to said hub whether controlling both or just one of said hub-side interposed section drive unit and blade-side interposed section drive unit based on the detected value from said hub-side blade angle sensor.

3. The horizontal-axis wind turbine according to claim 1, wherein
each of said hub-side interposed section drive unit and said blade-side interposed section drive unit includes a ring gear that is fastened to said hub, said interposed section or said blade and arranged with said pitch axis being a center axis thereof, and a gear that engages with said ring gear, as a transmission mechanism section; and
said horizontal-axis wind turbine further comprising:
a gear engagement position control unit for controlling both said hub-side interposed section drive unit and blade-side interposed section drive unit so that a direction of relative rotation of said interposed section with respect to said hub, and a direction of relative rotation of said blade with respect to said interposed section are in opposite directions, and changes a gear engagement position of said ring gear and said gear by that offset amount.

4. A horizontal-axis wind turbine comprising:
a rotor having a hub and one or more blades,
a nacelle that supports said rotor by way of a shaft that is connected to said hub so that said rotor can rotate freely,
a tower that supports said nacelle such that said nacelle is capable of free yaw rotation,
a yaw control mechanism for driving and controlling a yaw angle of said nacelle;
wherein
the hub and the nacelle are connected by an interposed section which can freely rotate around the yaw axis of the nacelle with respect to both said tower and said nacelle; and
said yaw control mechanism includes:
a tower-side interposed section drive unit that relatively rotates said interposed section with respect to said tower, and
a nacelle-side interposed section drive unit that relatively rotates said nacelle with respect to said interposed section;
a yaw control unit for controlling said yaw control mechanism, said yaw control unit being configured to control an angle of said nacelle around said yaw axis with respect to said tower whether controlling both or just one of said tower-side interposed section drive unit and nacelle-side interposed section drive unit for one blade;
a tower-side interposed section angle sensor that detects an angle of said interposed section around said yaw axis with respect to said tower, and
a nacelle-side interposed section angle sensor that detects an angle of said nacelle around said yaw axis with respect to said interposed section; wherein
said yaw control unit is configured to control an angle of said nacelle around said yaw axis with respect to said tower whether controlling both or just one of said tower-side interposed section drive unit and nacelle-side interposed section drive unit based on the detected value from said tower-side interposed section angle sensor and the detected value from said nacelle-side interposed section angle sensor.

5. The horizontal-axis wind turbine according to claim 4, further comprising
a tower-side nacelle angle sensor that directly detects an angle of said nacelle around said yaw axis with respect to said tower; wherein
said yaw control unit is configured to control the angle of said nacelle around said yaw axis with respect to said tower whether controlling both or just one of said tower-side interposed section drive unit and nacelle-side interposed section drive unit based on the detected value from said tower-side nacelle angle sensor.

6. The horizontal-axis wind turbine according to claim 4, wherein
each of said tower-side interposed section drive unit and said nacelle-side interposed section drive unit includes a ring gear that is fastened to said tower, said interposed section or said nacelle and arranged with said yaw axis being a center axis thereof, and a gear that engages with said ring gear, as a transmission mechanism section; and
said horizontal-axis wind turbine further comprising: a gear engagement position control unit for controlling both said tower-side interposed section drive unit and
nacelle-side interposed section drive unit so that a direction of relative rotation of said interposed section with respect to said tower and a direction of relative rotation of said nacelle with respect to said interposed section are in opposite directions, and changes a gear engagement position of said ring gear and said gear by that offset amount.

* * * * *